United States Patent [19]

Aizawa et al.

[11] Patent Number: 4,912,453
[45] Date of Patent: Mar. 27, 1990

[54] ELECTROMAGNETIC BELL UNIT, ITS FITTING STRUCTURE AND A METHOD OF WELDING THE BELL AND THE YOKE OF THE UNIT

[75] Inventors: Junichi Aizawa; Satoru Yamauchi; Shoichiro Kumazawa; Natsuki Hashiba; Tomohiro Wada, all of Tokyo, Japan

[73] Assignee: Seikosha Co., Ltd., Tokyo, Japan

[21] Appl. No.: 51,473

[22] Filed: May 18, 1987

[30] Foreign Application Priority Data

| May 16, 1986 [JP] | Japan | 61-73565[U] |
| Oct. 2, 1986 [JP] | Japan | 61-234993 |
| Oct. 28, 1986 [JP] | Japan | 61-165140[U] |

[51] Int. Cl.$^4$ .............................................. G08B 3/00
[52] U.S. Cl. .................................. 340/396; 340/402; 116/152
[58] Field of Search ............... 340/396, 393, 392, 388, 340/384 E, 402; 116/148, 152, 155, 162; 84/404-407

[56] References Cited

U.S. PATENT DOCUMENTS

| 2,442,611 | 6/1948 | Miller | 340/396 |
| 3,451,057 | 6/1969 | Zober et al. | 340/396 |
| 4,115,770 | 9/1978 | Karazawa | 340/396 |

Primary Examiner—Joseph A. Orsino
Assistant Examiner—Jeffery A. Hofsass
Attorney, Agent, or Firm—Bruce L. Adams; Van C. Wilks

[57] ABSTRACT

A miniaturized electromagnetic bell unit suitable for use with an alarm clock and the like is provided.

The bell unit of the present invention is characterized in that it is miniaturized in such a way that a yoke to which a coil and a bell hammer are attached is incorporated within a bell and the bell is fixed to the yoke. Besides the simplicity of its structure, the advantages of the present invention are that the bell hammer can be adjusted in a simple manner through a hole drilled in the bottom of the bell; both the bell and the yoke are held fixed together simply and firmly such that a positioner is inserted into holes drilled correspondingly through the bell and the yoke while at the same time, an arm integrally extending from the yoke is fixed to a fixing member; and further, another hole is drilled in the bottom of the bell and one of two electrodes is inserted into the bell through the hole while the other electrode is brought into contact with the outer surface of the bell whereby the yoke and the bell are spot-welded to each other simply and securely.

10 Claims, 3 Drawing Sheets

4,912,453

ELECTROMAGNETIC BELL UNIT, ITS FITTING STRUCTURE AND A METHOD OF WELDING THE BELL AND THE YOKE OF THE UNIT

BACKGROUND OF THE INVENTION

The present invention relates to an electromagnetic bell unit.

A conventional electromagnetic bell unit is shown in FIG. 8 and has a drive block 20 comprising a bell hammer 17 fixed with a hammer head 15 and a movable yoke 16. A coil 18 and a yoke 19 are provided outside a bell 21 and both the bell 21 and the drive block 20 are fixed to a fixing member 22.

However, the electromagnetic bell unit of the above structure has the drawback that since the drive block 20 is provided outside the bell 21, the entire space occupied by the unit becomes so large that it is difficult for a small-sized block to be provided with the bell unit.

In addition, since different members are required for mounting the bell hammer and yoke, the number of parts and the amount of time required for assembling the unit innevitably increase resulting in an increase in the manufacturing cost.

SUMMARY OF THE INVENTION

Accordingly, one object of the present invention is to provide an electromagnetic bell unit which is miniaturized and in which the number of parts and the amount of assembly time are considerably reduced.

Another object of the present invention is to provide an electromagnetic bell unit in which the bell hammer of the unit can be adjusted in a simple manner even after the unit is assembled.

A further object of the present invention is to provide a miniaturized electromagnetic bell unit having a fitting structure strong enough to withstand impacts applied thereon due to falling and the like.

Another object of the present invention is to provide a method of welding a bell and a yoke of an electromagnetic bell unit firmly and in a simple manner.

DETAILED DESCRIPTION OF THE INVENTION

Figure 1:
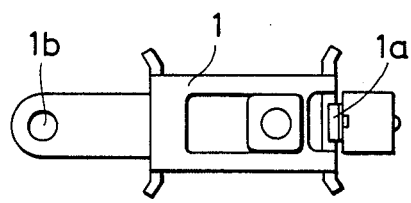
FIG. 1 is a plan view of an embodiment of a drive block according to the present invention.
Figure 2:
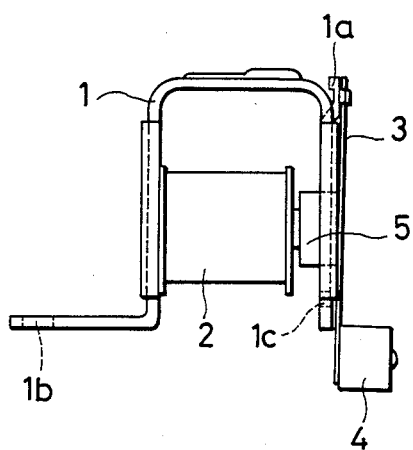
FIG. 2 is a front view of the drive block.
Figure 3:
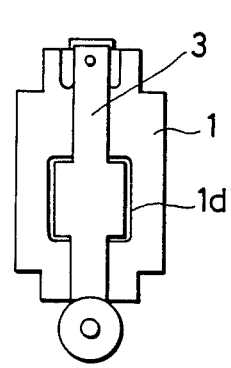
FIG. 3 is a right side view of the drive block.

In FIGS. 1 through 3 which show a drive block assembly according to the present invention, reference numeral 1 designates a yoke held stationary so as to surround an energizeable coil 2. The yoke 1 has a bell hammer fixing section bendable projection or projected portion 1a defining a formed integral with one of the corners thereof so as to extend upward. Further, at one end of the yoke 1, there is provided a hole 1b through which the yoke is screwed to the frame of a clock and at the other end, there is provided a snap-fitting hole 1c for fixing the yoke 1 more firmly to the clock frame. Reference numeral 3 designates a bell hammer which is fixed to the fixing section 1a of the yoke 1 at one end thereof by calking, soldering or resistance welding. The bell hammer 3 is provided with a hammer head 4 at the other end thereof and a movable yoke 5 made of a magnetic material at substantially the center thereof. The movable yoke 5 is inserted into a hole 1d drilled in the yoke 1.

Figure 4:
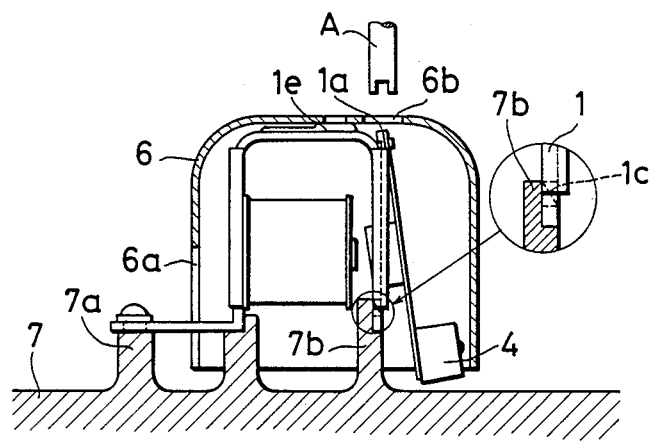
FIG. 4 is a sectional view of the drive bock of FIG. 1 in a state in which the drive block is fixed to a frame housing a bell therein.

The drive block assembly of the above structure is incorporated into a dome-shaped bell 6 as shown in FIG. 4, and the bottom of bell 6 is fixed to the yoke 1 through a dowel 1e of the yoke 1 by a screw, calking or resistance welding. The bell 6 is provided with a recess 6a through which one end of the yoke 1 is drawn out so as to be screwed to a fixing section 7a extending upright from the frame or support structure 7 of the clock. The other end of the yoke 1 makes a snap-fit with a fixing section 7b of the frame 7 so that the yoke 1 is firmly fixed to the frame 7. As a consequence, even when an external shock or impact is applied to the yoke 1 due to the falling of the clock, there is little danger of the yoke being dislocated from the clock.

By suitably energizing the coil 2, the movable yoke 5 is driven back and forth to vibrate the hammer head 4 which strikes the bell 6 to produce a bell sound.

Further, the bell 6 is provided with a hole 6b so that the fixing section 1a of the yoke 1 can be adjusted by the insertion and manipulation of a jig tool A into the hole 6b. That is, by adjusting the rising angle of the bell hammer 3 by bending the projection or projected portion 1a, the distance between the hammer head 4 and the bell 6 is adjusted so that the adjustment of the sound volume and quality is facilitated even after the bell unit is assembled into the clock.

Figure 5:
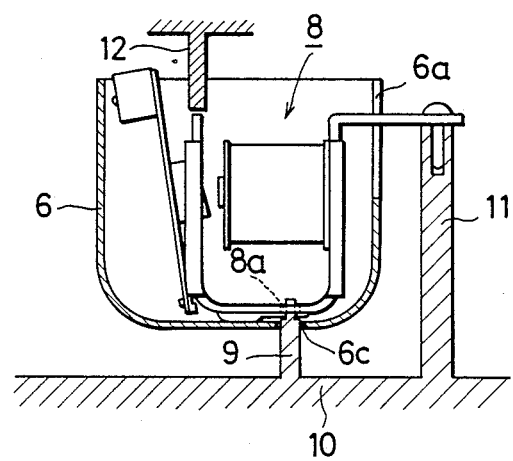
FIG. 5 is a sectional view of the drive block of FIG. 1 showing the drive block fixed to a different frame from that shown in FIG. 4.

FIG. 5 shows another embodiment of the drive block fitting structure according to the present invention wherein reference numeral 8 designates a drive block substantially the same as the first-mentioned embodiment. As shown, the drive block 8 includes a yoke having a hole or opening 8a and at the bottom of the bell 6 there is provided a hole or opening 6c slightly larger than, and drilled at a position corresponding to, the hole 8a. In this embodiment, the bell 6 is disposed with the dome-shaped part thereof adjacent a support structure 10.

The support structure or frame 10 of a clock is provided with a positioning member or part 9 and a fixing member or part 11 in the form of a pole, both of which extend upright from the frame 10.

With the above structure, when the positioning member 9 is fitted into the hole 6c of the bell 6 and the hole 8a of the yoke and then an arm portion of the yoke is screwed to the fixing member 11, the entire drive block is fixed to the frame 10. As a consequence, it is possible to fix the drive block simply and firmly by screwing the block to the frame at a single spot.

Further, the diameter of the hole 6c of the bell 6 is made larger than that of the positioning member 9 to provide a clearance therebetween so that the bell and the positioning member 9 do not come into contact with each other. Therefore, the bell 6 comes into contact only with the yoke at the bottom of the former thereby keeping a favorable sound volume.

Designated by reference numeral 12 is a stop rod formed integral with, or separately attached to, the frame 10 with its top end facing one end of the yoke leaving a small clearance from the latter. The stop rod 12 is suitably adjusted to prevent the yoke from becoming dislocated or deformed due to a possible impact resulting from the falling of the clock or other causes. For example, in case an external shock or impact is applied on the yoke in the upward direction in the state of FIG. 5 due to the falling of the clock, one end of the yoke will abut against the top end of the stop rod 12 so that the dislocation of the screw-fastening section of the yoke with respect to the clock frame or deformation thereof is prevented.

Figure 6:
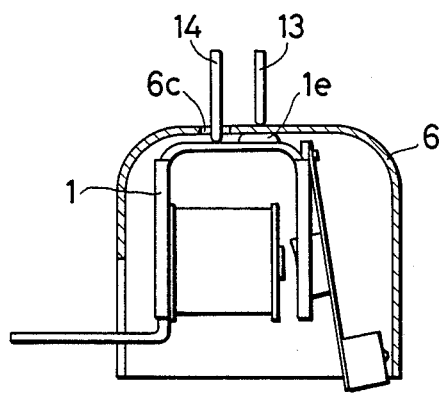
FIG. 6 is a front view (partially broken away) showing how the drive block is spot-welded to the bell.
Figure 7:
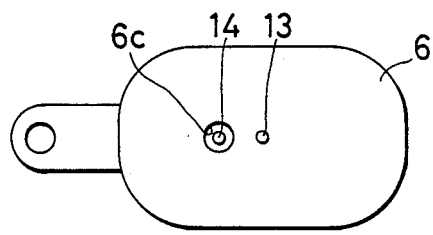
FIG. 7 is a plan view of the structure shown in FIG. 6.
Figure 8:
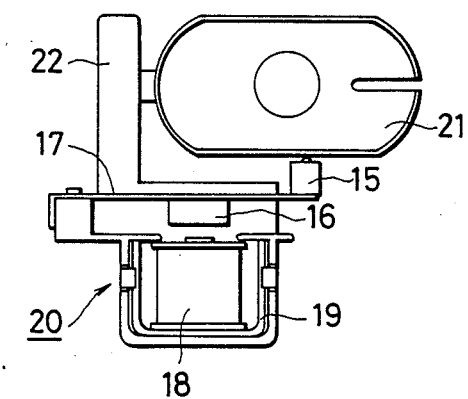
FIG. 8 is a front view of a conventional electro-magnetic bell unit.

Next, a method of spot-welding the bell and the yoke will be described. In FIGS. 6 and 7, the dowel 1e formed with the yoke 1 is pressed against the bell 6 at a suitable pressure and a spot-welding electrode 13 is brought into contact with the bottom of the bell 6. At the same time, another welding electrode 14 is brought into contact with the yoke 1 by inserting the electrode into the hole 6c of the bell 6. Then, when an electric voltage is applied across the electrode 13 and 14 in the above state, current flows through the electrode 13, the bell 6, the dowel 1a, the yoke 1 and the electrode 14 and as a result, the dowel 1e is spot-welded to the bell 6.

Thus, even in case the electrode 14 can not be inserted into the bell 6 because of the existence of the coil within the yoke, the spot-welding of the yoke and bell is possible. Moreover, there is almost no trace of welding on the outer bottom surface of the bell so that the external appearance of the bell is not spoiled.

According to the present invention, the drive block assembly comprising the coil, yoke and bell hammer is housed within the bell and the bell is fixed to the yoke of the block so that the entire structure of the bell unit is miniaturized, the fitting structure of the unit is simplified and the number of parts and the assembly time are reduced thereby lowering the manufacturing cost.

Further, as the bell hammer adjusting hole is drilled in the bottom surface of the bell, the angle of the bell hammer can be adjusted in a simple manner even after assembly, and the distance between the hammer head and the bell can also be adjusted.

In addition, the bell and the yoke can be fixed simply and firmly by inserting the positioning member into the holes of the bell and yoke and then fastening the arm portion of the yoke to the fixing member. In this case, as the yoke is directly fastened to the fixing member, the bell is kept out of contact with the other members and the quality of sound of the bell is not affected adversely thereby assuring a favorable sound.

Moreover, due to the fact that the bell and the yoke are spot-welded by bringing one of the welding electrodes into contact with the yoke through the hole in the bottom surface of the bell, even in case the electrode can not be inserted into the bell from the open side of the latter because of the existence of the coil, spot-welding of a sufficient strength can be performed in a simple manner. Further, since each of the welding electrodes can be used from the same direction, the welding operation is simplified and as there is no trace of welding, the external appearance of the bell unit is not spoiled.

What is claimed:

1. An electromagnetic bell unit comprising:
    a drive block assembly comprised of a coil, a yoke fixed with the coil, and a bell hammer having a magnet attached thereto and having one end thereof fixed to a projected portion of the yoke and having a hammer head at the other end thereof;
    a bell housing therein the drive block assembly, the bell having an inner bottom surface connected to the yoke for fixing the yoke to the bell; and
    means defining a hole in the bottom of the bell to enable insertion therethrough of a jig to bend the projected portion of the yoke for adjusting the distance between the hammer head and the bell.

2. An electromagnetic bell unit and external fixing means therefor comprising:
    a drive block assembly comprised of a curved yoke having an extended arm, a coil fixedly arranged within the yoke and a bell hammer having a magnet attached thereto and having one end thereof fixed to a projected portion of the yoke and having a hammer head at the other end thereof;
    a bell housing therein the drive block assembly, the bell having an inner bottom surface connected to the yoke for fixing the yoke to the bell such that the extended arm of the yoke extends outwardly of the yoke;
    means defining a hole in the bottom of the bell to enable insertion therethrough of a jig to bend the projected portion of the yoke for adjusting the distance between the hammer head and the bell; and
    external fixing means having one portion fixed to the extended arm of the yoke and another portion fixed to an end of the yoke by a snap-fit thereby firmly fixing the yoke.

3. An electromagnetic bell unit comprising: a drive block assembly comprised of a stationary yoke having two end portions for attachment to a support structure during use of the bell unit and a bendable projection, a bell hammer having one end thereof connected to the yoke projection and having a hammer head connected to the other end thereof, an energizeable coil attached to the yoke opposite the bell hammer, and a movable yoke connected to the bell hammer and coacting with the coil to effect vibration of the hammer head; a bell having a dome-shaped portion at least partially enclosing the drive block assembly; means fixedly connecting the yoke to the bell to position the hammer head in spaced relation from the bell whereby vibration of the hammer head causes the hammer head to strike the bell; and means including a hole in the bell to enable bending of the yoke projection to adjust the distance between the hammer head and the bell.

4. An electromagnetic bell unit according to claim 3; wherein the hole in the bell is positioned and dimensioned to enable a tool to be inserted therethrough and manipulated to bend the yoke projection.

5. An electromagnetic bell unit according to claim 3; wherein the means fixedly connecting the yoke to the bell comprises a spot weld.

6. An electromagnetic bell unit according to claim 3; including in combination therewith a support structure supporting thereon the yoke; and means connecting at least one of the yoke end portions to the support structure.

7. An electromagnetic bell unit according to claim 6; wherein the means connecting at least one of the yoke end portions comprises means connecting the two yoke end portions to the support structure.

8. An electromagnetic bell unit according to claim 7; wherein the support structure has an outwardly projecting part connected by means of a snap-fit to one of the yoke end portions.

9. An electromagnetic bell unit according to claim 6; wherein the bell is disposed such that the top of the dome-shaped portion is adjacent the support structure; and the support structure has an outwardly extending projecting part extending through an opening in the dome-shaped portion and connected to the yoke, the diameter of the opening being larger than that of the projecting part to define a clearance therebetween to prevent the bell from coming into contact with the projecting part.

10. An electromagnetic bell unit according to claim 6; including means connected to the support structure for abutting with the yoke in the event an external shock is applied to the support structure to prevent dislocation of the yoke from the support structure.

* * * * *